United States Patent
Liang et al.

(10) Patent No.: US 6,670,785 B1
(45) Date of Patent: Dec. 30, 2003

(54) ELECTRICAL MACHINE DRIVE SYSTEM AND METHOD

(75) Inventors: Feng Liang, Canton, MI (US); Henry Heping Huang, Canton, MI (US); Michael W. Degner, Novi, MI (US)

(73) Assignee: Ford Motor Company, Dearborn, MI (US)

( * ) Notice: Subject to any disclaimer, the term of this patent is extended or adjusted under 35 U.S.C. 154(b) by 21 days.

(21) Appl. No.: 10/064,197

(22) Filed: Jun. 20, 2002

(51) Int. Cl.$^7$ ............................. H02P 5/34; H02P 7/42; G01R 31/06; G01R 31/34

(52) U.S. Cl. ..................... 318/801; 181/806; 181/490; 324/772; 324/546; 388/801; 388/909

(58) Field of Search ................................. 318/801, 806, 318/771, 139, 490, 496, 498, 254, 439, 138; 324/772, 546; 322/99; 388/801, 807, 909, 804; 363/56, 57; 310/184, 185, 179, 166, 162, 168

(56) References Cited

U.S. PATENT DOCUMENTS

| | | | |
|---|---|---|---|
| 4,744,041 A | * 5/1988 | Strunk et al. | 318/490 |
| 4,996,477 A | * 2/1991 | Keeler et al. | 324/772 |
| 5,032,771 A | * 7/1991 | Kerkman et al. | 318/52 |
| 5,111,123 A | 5/1992 | Hach et al. | 318/434 |
| 5,448,149 A | * 9/1995 | Ehsani et al. | 318/701 |
| 5,543,698 A | * 8/1996 | Tao et al. | 318/611 |
| 5,883,344 A | * 3/1999 | Colby et al. | 318/807 |
| 5,892,342 A | * 4/1999 | Friedlander et al. | 318/434 |
| 5,942,876 A | * 8/1999 | Maekawa | 318/801 |
| 5,965,995 A | * 10/1999 | Seibel et al. | 318/805 |
| 6,078,173 A | 6/2000 | Kumar et al. | 324/158.1 |
| 6,121,736 A | * 9/2000 | Narazaki et al. | 318/254 |
| 6,242,873 B1 | 6/2001 | Drozdz et al. | 318/139 |
| 6,400,107 B1 | * 6/2002 | Nakatani et al. | 318/254 |
| 6,555,977 B1 | * 4/2003 | Du et al. | 318/254 |

OTHER PUBLICATIONS

Welchko, Brian A. et al., IPM Synchronous Machine Drive Response to a Single–Phase Open Circuit Fault, IEEE Applied Power Electronics Conference (APEC), Mar. 4–8, 2001, Paper No. 13A.1, pp. 1–7. (hereinafter"Welchko I").

Welchko, Brian A., et al., IPM Synchronous Machine Drive Response to Symmetric and Asymmetric Short Circuit Faults, EPE 2001—Graz, pp. 1–10. (hereinafter "Welchko II").

El–Antably et al., System Simulation of Fault Conditions in the Components of the Electric Drive System of an Electric Vehicle or an Industrial Drive, IECON 1993, vol. 2 Power Electronics, pp. 1146–1150. (hereinafter "El–Antably").

Ye, Zhongming et al., Simulation of Electrical Faults of Three Phase Induction Motor Drive System, PESC Record—IEEE Annual Power Electronics Specialists Conference, 2001, vol. 1, pp. 75–80 (hereinafer "Ye").

* cited by examiner

Primary Examiner—Robert Nappi
Assistant Examiner—Edgardo San Martin
(74) Attorney, Agent, or Firm—R. Hill & Associates

(57) ABSTRACT

An electrical machine drive system is simulated with a circuit simulator to model normal operation, fault modes and control strategies for electric motor based vehicles. The electrical machine drive system includes a DC power source model (102), an inverter model (104) and an electrical machine model (106). The system is modified through substitution of components or removal of components to simulate faults. Post-fault control strategies are implemented in a similar manner and simulated. The model and methods associated therewith reduce modeling complexity and reduce simulation time, permitting thorough design and analysis of electric motor based vehicles.

25 Claims, 4 Drawing Sheets

ELECTRICAL MACHINE DRIVE SYSTEM AND METHOD

BACKGROUND OF INVENTION

1. Field of the Invention

The present invention relates generally to electrical machine drive systems, and specifically, to a method and apparatus simulating fault modes and operational techniques for electrical machine drives for hybrid electric vehicles, electric vehicles and other systems.

2. Discussion of the Prior Art

The need to reduce fossil fuel consumption and emissions in automobiles and other vehicles predominately powered by internal combustion engines (ICEs) is well known. Vehicles powered by electric motors attempt to address these needs. Also, hybrid electric vehicles (HEV), which combine a smaller ICE with electric motors into one vehicle, attempt to address these needs.

Understanding electrical drive fault affects is critical in the design of electric vehicles and hybrid electric vehicles. In particular, where permanent magnet electric motors are employed, diagnosis and mitigation of fault modes are critical. This is due in part to the continuous existence of permanent magnet flux, which may produce pulsation torque, over voltage or over current conditions during certain fault modes.

Known methods for evaluating fault modes and operational techniques include modeling electrical drive system fault modes with a set of complex differential equations; simulating the system to determine the effects of the fault; selecting a post fault control strategy; modeling the post fault control strategy with a different set of complex differential equations; and simulating the system to determine the effects of the post fault control strategy. Welchko, Brian A. et al., "IPM Synchronous Machine Drive Response to a Single-Phase Open Circuit Fault," IEEE Applied Power Electronics Conference (APEC), Mar 4–8, 2001, Paper Number 13A. 1, pp. 1–7, and Welchko, Brian A. et al., "IPM Synchronous Machine Drive Response to Symmetric and Asymmetric Short Circuit Faults," EPE 2001—Graz, pp. 1–10, are exemplary of the conventional modeling and simulation techniques. Unfortunately, these known methods require complex differential equations, which must be revised for each model and post fault control strategy. In many fault modes the differential equations cannot even be derived. In addition, these methods require long simulation time.

Therefore, a need exists for a simple method and apparatus for simulating fault modes in electrical machine drive systems.

SUMMARY OF INVENTION

Accordingly, an object of the present invention is to provide an apparatus and method that reduces the complexity of modeling operational modes for electrical machine drive systems in electric or hybrid electric vehicles.

Another object of the present invention is to reduce the simulation time required to model electrical machine drive operation.

Yet another object of the present invention is to provide a method and apparatus to readily improve electric and hybrid electric vehicle design through simulation of electrical machine drive operation.

Other objects of the present invention will become more apparent to persons having ordinary skill in the art to which the present invention pertains from the following description taken in conjunction with the accompanying figures.

In accordance with one aspect of the invention, an electrical machine drive system is provided. The system includes a DC power source, an inverter model, and an electrical machine model. The DC power source is coupled to and drives the inverter model. The electrical machine model is coupled to the inverter to be driven by the inverter. The electrical machine model includes a first winding, a second winding, a third winding, a first mutual inductor, a second mutual inductor, and a third mutual inductor. The first, second and third winding are coupled together at a node. The first mutual inductor reflects a mutual coupling between the first winding and the second winding; the second mutual inductor reflects a mutual coupling between the second winding and the third winding; and the third mutual inductor reflects a mutual coupling between the third winding and first winding. Each of the first, second and third windings includes: (1) a voltage source coupled to the node intermediate the first, second and third windings; (2) a phase inductor coupled to the voltage source; and (3) a phase resistor coupled to the phase inductor. Preferably, the phase inductance of the phase inductor and the mutual inductance of the mutual inductor vary as a function of rotor position. Also, the voltage source preferably varies as a function of speed and electromagnetic field density.

In accordance with another aspect of the invention, a method is provided for simulating an electrical machine drive system simulation model. The method includes the step of simulating a response of the electrical machine drive simulation model. Preferably, the method further includes the step of selectively inserting faults in the electrical machine drive system simulation model. Faults are alternatively inserted by opening a connection in the simulation model or shorting a connection in the simulation model. The fault insertion may include adding or deleting components.

A further aspect of the present invention includes an alternative method for simulating an electrical machine drive system. In this method, the electrical machine drive system simulation model is stimulated with a plurality of ideal sinusoidal voltage sources. This simulates a steady state of the model in a relatively short simulation time. Then, if needed, the ideal sinusoidal voltage sources are disconnected from the model and further simulation continues with the electrical machine drive system simulation model being driven by the battery and/or inverter. And, the inverter is in turn controlled by a variety of pulse-width modulation signal generators. This simulates a transient behavior of the model and requires relatively longer simulation time due to the high frequency response of the inverter switches.

BRIEF DESCRIPTION OF DRAWINGS

The foregoing objects, advantages, and features, as well as other objects and advantages, will become apparent with reference to the description and figures below, in which like numerals represent like elements and in which.

DETAILED DESCRIPTION

Figure 1:
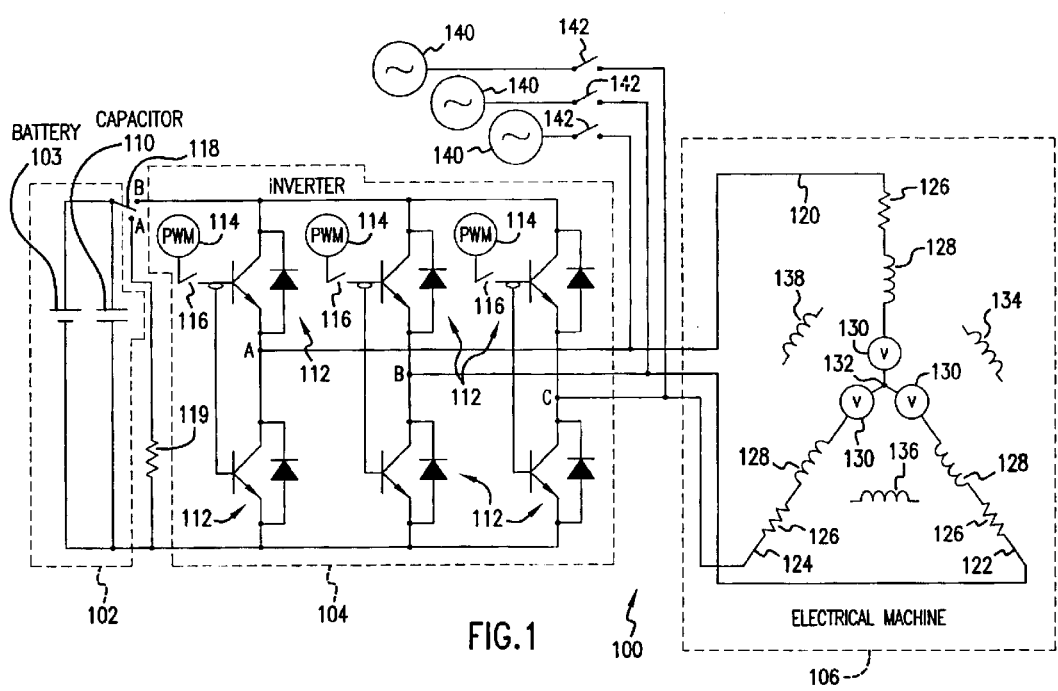
FIG. 1 is a schematic diagram illustrating an electrical machine drive system simulation model in accordance with a preferred embodiment of the present invention.

FIG. 1 is a schematic diagram showing an electrical machine drive system simulation model 100 in accordance with a preferred embodiment of the present invention. Electrical machine drive system simulation model 100 includes a DC (direct current) power source model 102, an inverter model 104, and an electrical machine model 106. Electrical machine drive system simulation model 100 is a circuit component level model of an electrical drive machine system, such as, for example, a battery, inverter and electric motor of a hybrid electric or electric vehicle. As shown in FIG. 1, D.C. power source 102 is coupled to inverter model 104 to provide a source of D.C. power to inverter model 104. The inverter model 104 is coupled to three-phase electrical machine model 106 to drive electrical machine model 106. In a preferred embodiment, electrical machine drive system simulation model 100 is simulated in a circuit simulator, such as, the SABER circuit simulator, sold by Avanti of Freemont, Calif. The circuit simulator is executed on a computer using the system simulation model, which is typically stored on a computer readable medium.

In the preferred embodiment, D.C. power source model 102 includes a battery 108 connected in parallel to a capacitor 110. Capacitor 110 is preferably a power capacitor.

In the preferred embodiment, inverter model 104 includes a plurality of power switches 112. More specifically, a pair of power switches is provided in inverter model 104 for each of the three phases of electrical machine model 106. Each pair of power switches that drive a phase is connected in a push-pull arrangement. Each power switch 112 preferably includes a transistor with a diode connected across the collector and emitter of the transistor. Each of the bases of the transistors in the pair is coupled together through an inverter such that one transistor base receives an inverted version of the signal received at the base of the other transistor of the pair. Most preferably, the bases of the transistors are driven by a pulse-width modulated source or signal generator 114, which is selectively coupled to the bases via switches 116.

Electrical machine model 106 preferably includes three windings: a first winding 120, a second winding 122, and a third winding 124. The three windings model the three windings/phases of a three-phase electric motor. Electrical machine model 106 preferably models the characteristics of a permanent magnet induced electrical motor. As shown in FIG. 1, each of the three windings is separately driven by a pair of power switches 112 in inverter model 104. More specifically, each winding is coupled at the junction of the emitter and collector of the transistors of the power switch pairs.

Each of the three windings 120, 122, 124 includes a phase resistor 126, a phase inductor 128, and a voltage source 130. Preferably, phase resistor 126 is coupled to phase inductor 128, which is coupled to voltage source 130. Each of the voltage sources 130 of the three windings is coupled together at a node 132. Mutual inductance that is created due to the mutual coupling between the three windings is modeled in electrical machine 106. In particular, a first mutual inductor 134, a second mutual inductor 136 and a third mutual inductor 138 are modeled in electrical machine model 106. First mutual inductor 134 represents a mutual coupling between first winding 120 and second winding 122. Similarly, second mutual inductor 136 represents a mutual coupling between second winding 122 and third winding 124. Third mutual inductor 138 represents a mutual coupling between third winding 124 and first winding 120. In accordance with the present invention, the phase inductances of the phase inductors 128 and the mutual inductances of the mutual inductors 134, 136, 138 vary as a function of a rotor position. Also, the voltage source 130 is a function of rotor speed and electromagnetic field density of the electric motor being modeled.

In accordance with an aspect of the present invention, electrical machine drive system simulation model 100 is a generic electric machine drive model composed of circuit component models known to a circuit simulator. This arrangement avoids a user generating complex differential equations to model and simulate operational and fault modes of the system. Rather, the circuit simulator handles this complexity automatically. As discussed further below, this permits ready simulation of operational, fault, and post-fault arrangements, circuits and strategies.

The phase inductor 128 and the first, second and third mutual inductors 134, 136, 138 are preferably improved over standard inductor models and standard mutual inductor models traditionally found in circuit simulators. In particular, the inductances of these inductors vary as a function of a rotor position in an associated motor. To accommodate this varying inductance the phase inductor models are modified. More specifically, the phase inductance and resultant voltage are calculated by, for each simulation step: (1) determining the rotor position θ; (2) calculating an inductance L as a function of the rotor position θ; (3) retrieving the current i in the winding from the simulator; (4) calculating a voltage drop due to the phase resistor 126 (Vr=i*r); and (5) calculating a total voltage Vt (Vt=Vr+L*di/dt+I*dL/dt). The. mutual inductances and resultant voltages are calculated by, for each simulation step: (1) determining the rotor position θ; (2) calculating the mutual inductance M as a function of θ; (3) retrieving the current i1 from the simulator, where i1 is the current in the first winding that contributes to the mutual coupling; (4) retrieving the current i2 from the simulator, where i2 is the current in the second winding that contributes to the mutual coupling; (5) retrieving the current i3 from the simulator, where i3 is the current in the third winding that contributes to the mutual coupling; (6) calculating a new i1 with consideration of mutual inductance from the second and third winding; (7) calculating a new i2 with consideration of mutual inductance from the first and third windings; and (8) calculating a new i3 with consideration of mutual inductance from the first and second winding.

Electrical machine drive system simulation model 100 preferably includes ideal sinusoidal voltage sources 140 coupled selectively by switches 142 to drive electrical machine model 106. In accordance with one aspect of the present invention, sinusoidal voltage sources 140 are selectively used to stimulate electrical machine model 106 instead of inverter model 104. As discussed further below, this permits fast steady state simulation of electrical machine drive system simulation model 100 without the overhead of high frequency simulation of pulse-width modulated sources 114.

Advantageously, electrical machine drive simulation model 100 is suited for simulation of operational, fault, and post-fault mitigation and control strategies. To simulate operational aspects of the electrical machine drive simulation model, the components of the model and the associated parameters, such as values (resistance, inductance, transistor characteristics, etc.), and timing, that reflect the electrical machine drive system to be simulated are input into the circuit simulator and simulation cycles are run. In accordance with a preferred aspect of the invention, ideal sinusoidal voltage sources 140 are initially selected to drive electrical machine model 106 by closing switches 142 and leaving switches 116 open and placing switch 118 in position A. Then after a steady state is obtained, ideal sinusoidal voltage sources 140 are selectively removed from the circuit model by opening switches 142 and pulse-width modulated sources 114 are selectively inserted into the simulation by closing switches 116 and placing switch 118 in position B. Then a transient response of the system is simulated for a period of time. The high frequency of the pulse-width modulated sources causes a long simulation time. Therefore, the capability to switch out the pulse-width modulated sources eliminates the high frequency responses of the transistors, but still simulates circuit operation. Switch 118 is used to connect DC power source 102 to the inverter model 104. In position A, switch 118 connects DC power source 102 to an equivalent resistor 119. Resistor 119 is selected to represent an input resistance of inverter model 104 and electrical machine model 106. Connecting DC power source 102 to equivalent resistor 119 permits the DC power source to simulate a connection to inverter model 104 even though it is not directly connected to inverter model 104. This feature is used to insure the DC power source is in a proper state when switched to connect with inverter model 104. In some fault mode simulations, the pulse-width modulated sources are not needed and therefore switches 116 are left open.

To simulate a fault mode, electrical machine drive system simulation model 100 is configured to simulate a particular fault. Preferably, a component is added or deleted from the model to reflect the fault to be simulated. For example, a wire is added across a component or in place of a component to reflect a short circuit or other fault of that component. Or, a circuit is removed or a connection disconnected to reflect an open circuit or other fault. Where required, switches are preferably added to selectively insert the fault or replicate an intermittent fault. The selective insertion of ideal voltage sources or pulse-width modulated sources may be used in simulating faults.

Figure 2:
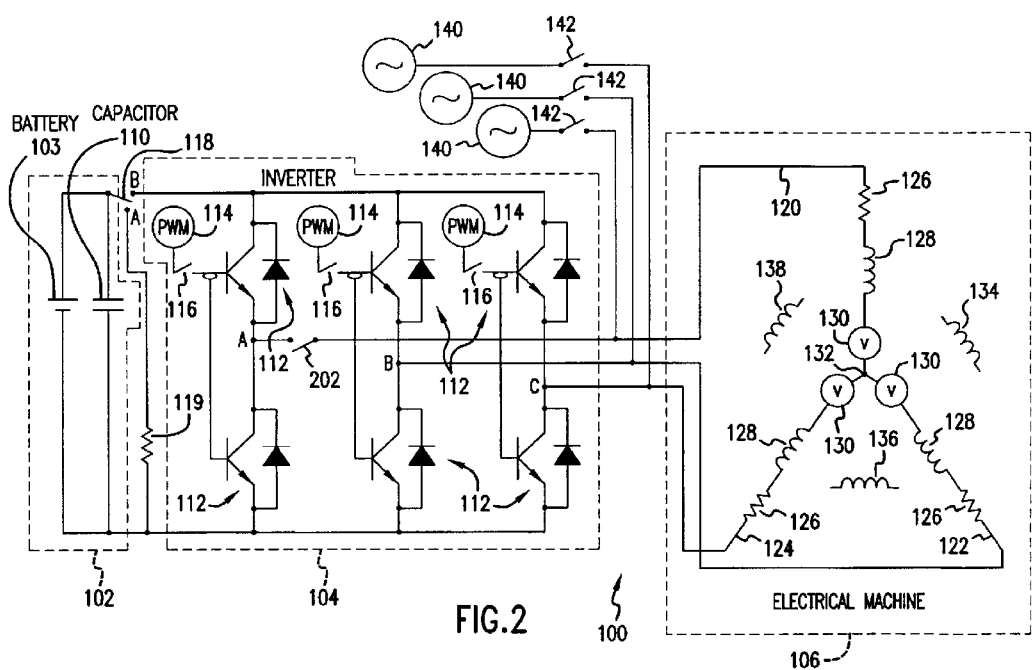
FIG. 2 is a schematic diagram illustrating an electrical machine drive system simulation model with faults selectively inserted in accordance with a preferred embodiment of the present invention.
Figure 3:
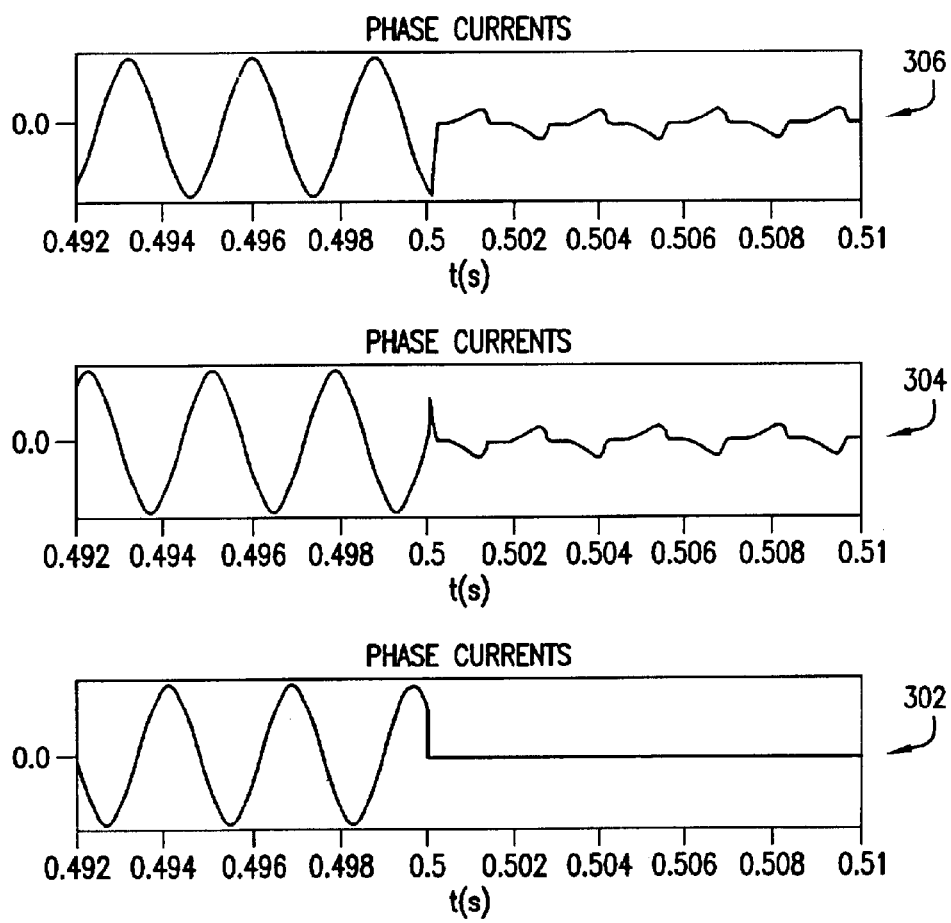
FIG. 3 is a graph illustrating a simulation of the model of FIG. 2.

FIG. 2 is a schematic circuit diagram of the model 100 with selective modification to simulate a fault mode. More specifically, FIG. 2 simulates a fault due to an open in the first winding. The open is selectively inserted into the model by opening switch 202. FIG. 3 is a graph showing a plot of the three winding/phase currents for a simulation of the circuit of FIG. 2. The phase currents are plotted versus time. At time 0.5 seconds, switch 202 is opened to simulate the open fault in the first winding.

Curve 302 is the phase current of the first winding; curve 304 is the phase current for the second winding; and curve 306 is the phase current of the third winding. Notably, phase currents before and after the fault are captured.

Figure 4:
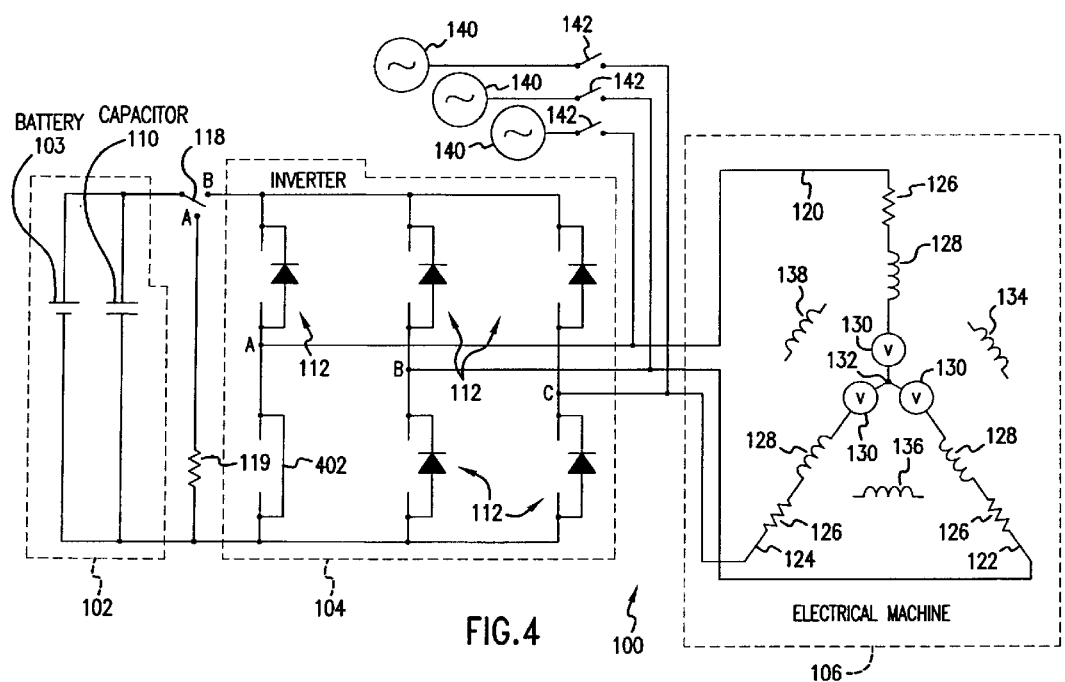
FIG. 4 is a schematic diagram illustrating an electrical machine drive system simulation model with faults selectively inserted in accordance with another preferred embodiment of the present invention.

FIG. 4 is a schematic diagram of electrical machine drive system simulation model 100 configured to simulate a fault mode where all transistors in inverter model 104 are open due to an over current condition and one diode is shorted. The open transistors are simply removed from the model and a wire 402 represents the short of the diode.

As discussed above, the present invention provides a generic electrical machine drive system simulation model. The generic model is readily simulated without development of complex differential equations to model system operation. Fault modes and post-fault control and operational strategies are readily simulated through modification of the generic model. In addition, simulation time is advantageously reduced by the use of ideal sinusoidal voltage sources selectively used to replace high frequency switching due to pulse-width modulated sources.

The above-described embodiments of the invention are provided purely for purposes of example. Many other variations, modifications, and applications of the invention may be made.

What is claimed is:

1. An electrical machine drive system comprising:
    a DC power source model;
    an inverter model coupled to the DC power source; and
    an electrical machine model coupled to the inverter, the electrical machine model comprising:
        a first winding, a second winding, a third winding, a first mutual inductor, a second mutual inductor, and a third mutual inductor;
        wherein the first winding, the second winding, and the third winding are coupled together at a node;
        wherein the first mutual inductor reflects a mutual coupling between the first winding and the second winding, the second mutual inductor reflects a mutual coupling between the second winding and the third winding, and the third mutual inductor reflects a mutual coupling between the third winding and the first winding; and
        wherein each of the first winding, the second winding and the third winding comprises:
            a voltage source coupled to the node, a phase inductor coupled to the voltage source, and a phase resistor coupled to the phase inductor.

2. The system of claim 1 wherein the phase inductor includes a variable inductance that varies as a function of rotor position.

3. The system of claim 1 wherein each of the first mutual inductor, the second mutual inductor and the third mutual inductor includes a variable inductance that varies as a function of rotor position.

4. The system of claim 1 wherein the voltage source varies as a function of a speed and electromagnetic field density.

5. The system of claim 1 wherein the inverter comprises a plurality of switches that are coupled to the first winding, the second winding and the third winding.

6. The system of claim 5 wherein each of the switches of the plurality of switches is driven by a pulse-width modulated signal generator.

7. The system of claim 1 wherein the DC power source model includes a battery and a capacitor.

8. The system of claim 5 wherein the first winding, the second winding and the third winding are selectively driven by the plurality of switches or a plurality of ideal sinusoidal voltage sources.

9. The system of claim 5 wherein each switch of the plurality of switches comprises a transistor and a diode coupled across the transistor.

10. A method for simulating an electrical machine drive system comprising the step of:
    simulating a response of an electrical machine drive system simulation model, the electrical machine drive simulation model comprising:
        a DC power source model;
        an inverter model coupled to the DC power source; and
        an electrical machine model coupled to the inverter, the electrical machine model comprising:
            a first winding, a second winding, a third winding, a first mutual inductor, a second mutual inductor, and a third mutual inductor;

wherein the first winding, the second winding, and the third winding are coupled together at a node;

wherein the first mutual inductor reflects a mutual coupling between the first winding and the second winding, the second mutual inductor reflects a mutual coupling between the second winding and the third winding, and the third mutual inductor reflects a mutual coupling between the third winding and the first winding; and wherein each of the first winding, the second winding and the third winding comprises:

a voltage source coupled to the node, a phase inductor coupled to the voltage source, and a phase resistor coupled to the phase inductor.

11. The method of claim 10 further comprising the step of:

selectively inserting a fault in the electrical machine drive system simulation model.

12. The method of claim 11 wherein the step of selectively inserting a fault further comprises opening a connection in the electrical machine drive system simulation model.

13. The method of claim 11 wherein the step of selectively inserting a fault further comprises shorting a connection in the electrical machine drive system simulation model.

14. The method of claim 11 wherein the step of selectively inserting a fault further comprises adding a component to the electrical machine drive system simulation model.

15. The method of claim 11 wherein the step of selectively inserting a fault further comprises deleting a component from the electrical machine drive system simulation model.

16. The method of claim 11 further comprising the step of:

modifying the electrical machine drive system simulation model to mitigate an effect of the fault.

17. The method of claim 16 wherein the step of modifying the electrical machine drive system simulation model further comprises at least one of:

opening a connection in the electrical machine drive system simulation model;

shorting a connection in the electrical machine drive system simulation model;

adding a component to the electrical machine drive system simulation model; and deleting a component from the electrical machine drive system simulation model.

18. The method of claim 10 further comprising the step of:

selectively driving the electrical machine model with the inverter or at least one ideal sinusoidal voltage source.

19. A method for simulating an electrical machine drive system comprising the step of:

simulating a response of an electrical machine drive system simulation model to a plurality of ideal voltage sources, the electrical machine drive simulation model comprising:

a DC power source model;

an inverter model coupled to the DC power source;

an electrical machine model coupled to the inverter; and selectively coupled to the plurality of ideal voltage sources;

disconnecting the plurality of ideal voltage sources from the electrical machine model; and simulating a response of the electrical machine drive system simulation model to the inverter being driven by at least one of a plurality of pulse-width modulated signal generators and the DC power source model.

20. The method of claim 19 wherein the step of simulating the response of the electrical machine drive system simulation model to the plurality of ideal voltage sources further comprises the step of connecting the DC power source to a resistor that reflects a resistance of the inverter model and the electrical machine model.

21. An article of manufacture for simulating operation of an electrical machine drive system, the article of manufacture comprising:

a computer usable medium; and a computer readable code embodied in the computer usable medium that includes:

a DC power source model;

an inverter model coupled to the DC power source; and an electrical machine model coupled to the inverter, the electrical machine model comprising:

a first winding, a second winding, a third winding, a first mutual inductor, a second mutual inductor, and a third mutual inductor;

wherein the first winding, the second winding, and the third winding are coupled together at a node;

wherein the first mutual inductor reflects a mutual coupling between the first winding and the second winding, the second mutual inductor reflects a mutual coupling between the second winding and the third winding, and the third mutual inductor reflects a mutual coupling between the third winding and the first winding; and wherein each of the first winding, the second winding and the third winding comprises:

a voltage source coupled to the node, a phase inductor coupled to the voltage source, and a phase resistor coupled to the phase inductor.

22. The article of manufacture of claim 21 wherein the phase inductor includes a variable inductance that varies as a function of rotor position.

23. The article of manufacture of claim 21 wherein each of the first mutual inductor, the second mutual inductor and the third mutual inductor includes a variable inductance that varies as a function of rotor position.

24. The article of manufacture of claim 21 wherein the inverter comprises a plurality of switches that are coupled to the first winding, the second winding and the third winding.

25. The article of manufacture of claim 24 wherein the first winding, the second winding and the third winding are selectively driven by the plurality of switches or a plurality of ideal sinusoidal voltage sources.

* * * * *